US 9,451,533 B2

United States Patent
Ren et al.

(10) Patent No.: US 9,451,533 B2
(45) Date of Patent: Sep. 20, 2016

(54) SMALL CELL DETECTION METHOD AND APPARATUSES USING THE SAME

(71) Applicant: Industrial Technology Research Institute, Hsinchu (TW)

(72) Inventors: Fang-Ching Ren, Hsinchu (TW); Hung-Chen Chen, Kaohsiung (TW); Wei-Chen Pao, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 18 days.

(21) Appl. No.: 13/954,992

(22) Filed: Jul. 31, 2013

(65) Prior Publication Data
US 2014/0038598 A1 Feb. 6, 2014

Related U.S. Application Data

(60) Provisional application No. 61/677,486, filed on Jul. 31, 2012.

(51) Int. Cl.
*H04W 4/00* (2009.01)
*H04W 48/16* (2009.01)
*H04W 84/04* (2009.01)

(52) U.S. Cl.
CPC .......... *H04W 48/16* (2013.01); *H04W 84/045* (2013.01)

(58) Field of Classification Search
CPC .......................... H04W 48/16; H04W 84/045
USPC ....... 455/434, 436, 412.1–414.2, 418–422.1, 455/444, 552.1, 456.1; 370/328, 338, 329, 370/331
See application file for complete search history.

(56) References Cited

U.S. PATENT DOCUMENTS

| 8,290,497 | B2 | 10/2012 | Tajima et al. |
| 8,305,987 | B2 | 11/2012 | Fong et al. |
| 2006/0009246 | A1* | 1/2006 | Marinier ............... H04W 8/005 455/502 |
| 2012/0088516 | A1 | 4/2012 | Ji et al. |

(Continued)

FOREIGN PATENT DOCUMENTS

| CN | 102404780 | 4/2012 |
| CN | 102547896 | 7/2012 |

(Continued)

OTHER PUBLICATIONS

"Office Action of Taiwan Counterpart Application", issued on Dec. 2, 2014, p. 1-p. 13.

(Continued)

*Primary Examiner* — Babar Sarwar
(74) *Attorney, Agent, or Firm* — Jianq Chyun IP Office

(57) ABSTRACT

The present disclosure provides a method of performing a small cell detection, a small cell base station using the same method, and a mobile electronic device using the same method. The method and the device would perform functions including a user equipment (UE) detecting a discovery signal from a small cell base station (BS) over a schedulable resource in a Macro cell frequency, the user equipment transmitting a detection report to a Macro cell BS in response to detecting the discovery signal, the UE receiving a measurement command to measure a small cell BS in the small cell frequency, and generating and transmitting the measurement report after measuring the small cell BS in the small cell frequency.

25 Claims, 12 Drawing Sheets

(56) References Cited

U.S. PATENT DOCUMENTS

2012/0129527 A1* 5/2012 Takeuchi et al. ............ 455/436
2012/0263145 A1 10/2012 Marinier et al.
2012/0315886 A1 12/2012 Lin

FOREIGN PATENT DOCUMENTS

| EP | 2456262 | 5/2012 |
|---|---|---|
| WO | 2011126186 | 10/2011 |
| WO | 2011161015 | 12/2011 |
| WO | 2011163273 | 12/2011 |

OTHER PUBLICATIONS

Qualcomm Incorporated, "Inter-frequency Small Cell Identification," 3GPP TSG RAN2 Meeting 77, Feb. 6-10, 2012, pp. 1-2.
Nokia Siemens Networks, Nokia Corporation, NTT DOCOMO, Inc "Background search for small cell detection," 3GPP TSG RAN WG2 Meeting 78, May 21-25, 2012, pp. 1-9.
NTT Docomo, Inc., "Enhanced cell identification and measurements for CA," 3GPP TSG RAN WG2 Meeting 77, Feb. 6-10, 2012, pp. 1-3.
Nokia Siemens Networks, Nokia Corporation, "Enhanced MSE based small cell detection," 3GPP TSG RAN WG2 Meeting 78, May 21-25, 2012, pp. 1-5.
Alcatel-Lucent, Alcatel-Lucent Shanghai Bell, "On UE-speed-based methods for improving the mobility performance in HetNets," 3GPP TSG RAN WG2 Meeting 77, Feb. 6-10, 2012, pp. 1-6.
Nokia Siemens Networks, Nokia Corporation, "Small cell signal based control of inter-frequency measurements," 3GPP TSG RAN WG2 Meeting 77bis, Mar. 26-30, 2012, pp. 1-5.
Renesas Mobile Europe Ltd., "Enhancement of proximity indication in heterogeneous networks," 3GPP TSG RAN WG2 Meeting 75bis, Mar. 26-30, 2012, pp. 1-4.
Alcatel-Lucent, Alcatel-Lucent Shanghai Bell, "On Network-Assisted Pico Cell Discovery in LTE HetNets," 3GPP TSG RAN WG2 Meeting 75, Aug. 22-26, 2011, pp. 1-3.
Ericsson, ST-Ericsson, "Small Cell Detection," 3GPP TSG RAN WG2 77bis, Mar. 26-30, 2012, pp. 1-3.
Huawei, HiSilicon, "Small Cell Discovery in HetNet," 3GPP TSG RAN WG2 Meeting 77bis, Mar. 26-30, 2012, pp. 1-7.
3GPP Organizational Partners, "3rd Generation Partnership Project; Technical Specification Group Radio Access Network; Evolved Universal Terrestrial Radio Access (E-UTRA); Mobility Enhancements in Heterogeneous Networks (Release 11)," 3GPP TR 36.839 V0.5.0, Feb. 2012, pp. 1-28.
Samsung, "Pico Cell discovery issues," 3GPP TSG RAN WG2 77bis, Mar. 26-30, 2012, pp. 1-3.
"Office Action of China Counterpart Application", issued on Mar. 2, 2016, p. 1-p. 6.

* cited by examiner

| S-BS# | 1 | 2 | 3 | 4 | 5 | 6 |
|---|---|---|---|---|---|---|
| DS pattern | A | A | A | B | B | B |
| Subframe, subchannel, or RB unmber | 1 | 2 | 3 | 1 | 2 | 3 |

FIG. 9

SMALL CELL DETECTION METHOD AND APPARATUSES USING THE SAME

CROSS REFERENCE TO RELATED APPLICATION

This application claims the priority benefit of U.S. provisional application Ser. No. 61/677,486, filed on Jul. 31, 2012. The entirety of the above-mentioned patent application is hereby incorporated by reference herein and made a part of specification.

TECHNICAL FIELD

The present disclosure generally relates to a method of performing a small cell detection, a small cell base station using the same method, and a user equipment using the same method.

RELATED ART

In more densely populated locations, base stations (BSs) with lower-powered radio access to support smaller coverage than that of Macro cell BSs including Micro cell BSs, Pico cell BSs, or Femto cell BSs, have been deployed to perform various functions such as to offload data traffic between mobile electronic devices and a cellular network. In the present disclosure, a base stations (BS) such as a Micro cell BS, a Pico cell BS, or a Femto cell BS would be referred to as small cell BS. A Macro cell BS conventionally would be the type of BS with the highest transmission power and range, and a small cell would typically provide a coverage range less than the Macro cell BS.

Small cell BSs used as hotspot deployments for offloading and load balancing purposes may result in a network having a non-uniform coverage. Consequently a user equipment (UE) would be required to perform detections and measurements for frequencies of small cell BSs in order to achieve data offloading potentials. Such achievement may include maximizing amounts of data transmitted to small cells rather than to Macro cells, minimizing data traffic latency with the network, and maximizing the time a mobile user equipment would stay out of a Macro cell BS, and so forth.

More specifically, when a small cell is deployed on a frequency which is different from the frequency of a Macro cell, an UE may have to perform inter-frequency measurements in order to detect whether the UE has entered the coverage of the small cell. If an UE could not receive signals on both small cell and Macro cell frequencies simultaneously, the UE may utilize a measurement gap to interrupt receptions on the Macro cell frequency and switch receiving frequency in order to measure signals on a small cell frequency. However, since small cells are non-uniformly deployed, small cells' coverage may only exist in certain areas and may not exist in other areas. The interruption of measurement gaps may result in power and resources be needlessly wasted while there is no small cell coverage nearby the UE.

FIG. 1 illustrates an exemplary scenario of a Macro cell BS 101 which provides a Macro cell coverage range 104 in conjunction with two small cell BSs 102 and 103. The two small call BSs 102 and 103 would provide coverage range 105 and 106, respectively, which at least partially overlap with the Macro cell coverage range 104. As shown in FIG. 1, an UE would only be able to detect the existence of the radio coverage of small cell BSs in areas 105 and 106 by performing inter-frequency measurements. While outside of the areas 105 and 106, it would be useless for the UE to perform inter-frequency measurement for small cell detections. Therefore, it could be helpful to devise a method to initiate inter-frequency measurements for small cells in order to assist an UE to efficiently detect the existence of small cells on other frequencies within a non-uniform cell coverage.

One type of solution could be to transmit a discovery signal on Macro cell frequency formed by legacy control channels such as the Primary Synchronization Sequence (PSS) or the Secondary Synchronization Sequence (SSS) or System Information Block Type 0/1 (SIB0/SIB1) with possibly a barring indicator with IFRI (Intra Frequency Reselection Indicator) set to "allowed in order to inform mobile user equipments of the existences of small cell coverage. Therefore, the discovery signal could be detected and measured by an UE without interruption of measurement gaps while the UE connects with a Macro cell BS. Then the detection and measurement results of the discovery signal could be reported to the connecting Macro cell BS and the Macro cell BS may configure the UE to perform inter-frequency measurements for measurement of small cell frequencies to confirm the signal quality on small cell frequency or to immediately trigger a handover to a discovered small cell BS without further measurements.

However, since signals such as PSS, SSS, and System information would be scheduled in the same radio resource having statically configured periods. When small cell BSs use these signals on a Macro cell frequency as discovery signals, these discovery signals would create interferences on the Macro cell frequency to hinder the reception of Macro cell control signals (PSS, SSS, and System information). Furthermore, while a small cell BS transmits PSS, SSS, and System information on the frequency of the Macro cell, it may interrupt the transmission of PSS, SSS, and System information on small cell serving frequency if the small cell BS does not have carrier aggregation capability to simultaneously transmit and receive on both Macro cell and small cell frequencies.

SUMMARY OF THE DISCLOSURE

Accordingly, the present disclosure is directed to a small cell detection method, a UE using the same method, and a small cell base station using the same method.

The present disclosure directs to a small cell detection method performed from the perspective of a user equipment, and the method includes the elements of detecting a discovery signal over a schedulable resource in a first frequency, transmitting a detection report in response to detecting the discovery signal, receiving a measurement command comprising a second frequency, measuring at least a signal quality of the second frequency to generate a measurement report, and transmitting the measurement report in response to generating the measurement report of the at least one second frequency.

The present disclosure directs to user equipment which includes at least but not limited to a transmitter for transmitting wireless data, a receiver for receiving wireless data, and a processing circuit coupled to the transmitter and the receiver and is configured for detecting a discovery signal over a schedulable resource in a first frequency, transmitting through the transmitter a detection report in response to detecting the discovery signal, receiving through the receiver a measurement command comprising a second frequency, measuring at least a signal quality of the second frequency to generate a measurement report, and transmitting through the transmitter the measurement report in response to generating the measurement report.

The present disclosure directs to a small cell detection method performed from the perspective of a small cell base station, and the method includes the elements of receiving a schedulable resource for transmitting a discovery signal over a first frequency, transmitting the discovery signal over the first frequency, and transmitting data over a second frequency which is the operating frequency of the small cell base station.

The present disclosure directs to a small cell base station which includes at least but not limited to a transmitter for transmitting wireless data, a receiver for receiving wireless data, and a processing circuit coupled to the transmitter and the receiver and is configured for receiving a schedulable resource for transmitting a discovery signal over a first frequency, transmitting the discovery signal over the first frequency, transmitting data over a second frequency which is the operating frequency of the small cell base station.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 9 illustrates a look up table from which a Macro base station may utilize to negotiate with small base stations for resources to transmit a discovery signal.

DETAILED DESCRIPTION OF DISCLOSED EMBODIMENTS

Figure 1:
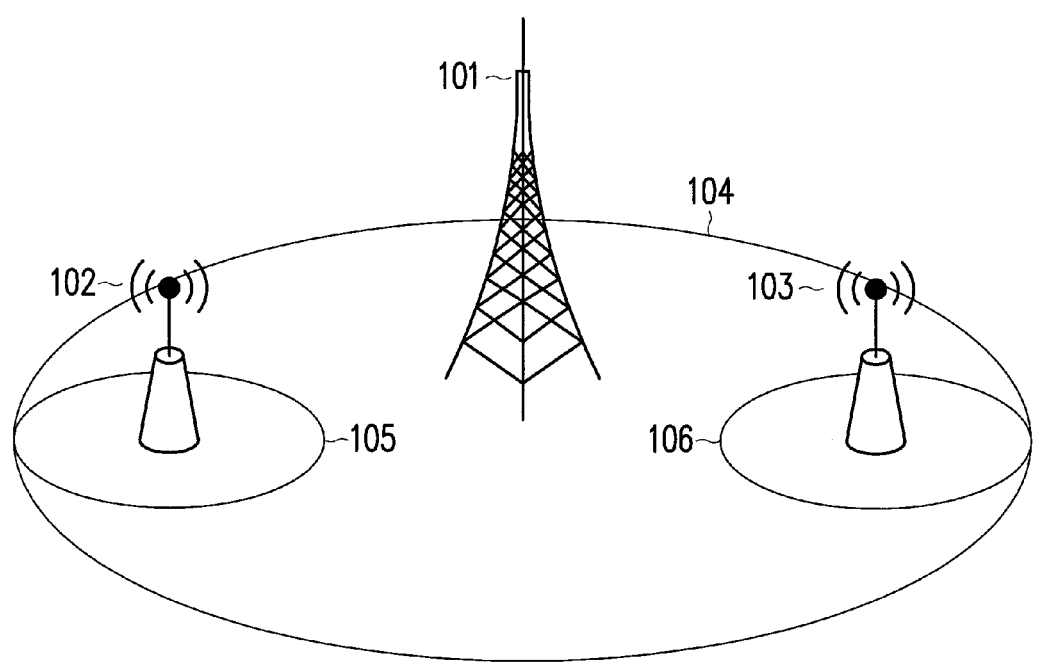
FIG. 1 illustrates an exemplary scenario of non-uniformly deployed small cells which includes the coverage of a overlaid Macro cell BS in conjunction with the coverage of two small cell BSs on other frequencies.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
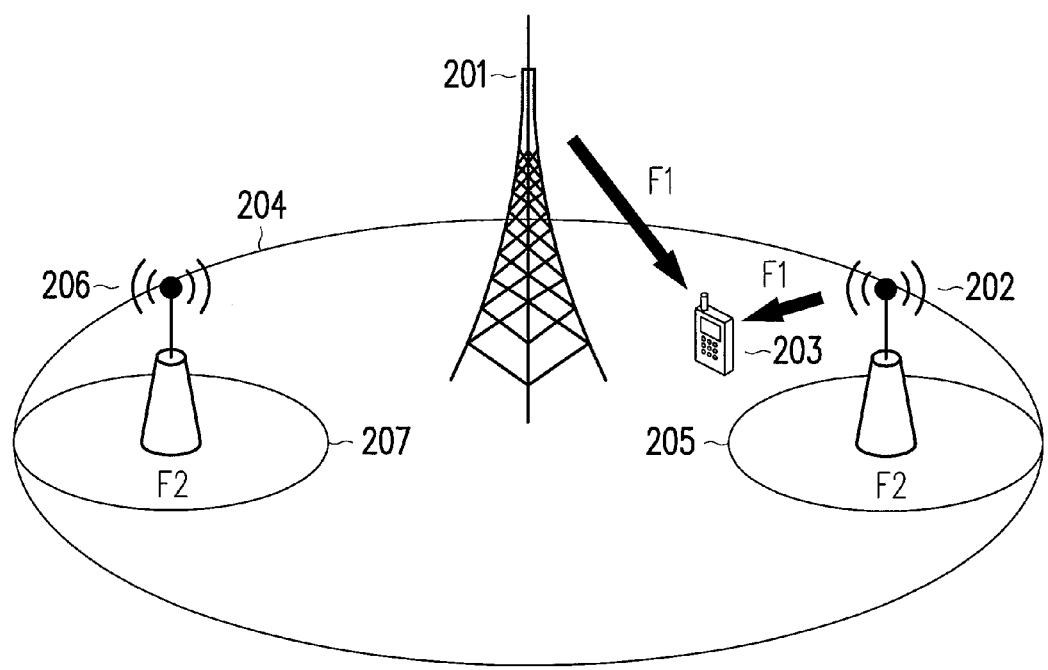
FIG. 2 illustrates a small cell detection and handover method in accordance with one of the exemplary embodiments of the present disclosure.

FIG. 2 illustrates a small cell detection and handover scenario in accordance with one of the exemplary embodiments of the present disclosure. The scenario of FIG. 2 may include at least but not limited to a Macro cell BS 201, one or more small cell BS such as small cell BS 202 and small cell BS 206, and a UE 203 having device mobility. The Macro cell BS 201 may operate with a carrier frequency F1 and is assumed to have a typical Macro cell communication range 204 which could be more than 35 kilometers depending on the equipped transmission power. The small cell BS 202 operates with a carrier frequency F2 and could be any one of a Micro cell BS, a Pico cell BS, and a Femto cell BS. The small cell BS 202 or 206 is assumed to have a typical communication range of a small cell BS 205 or 207 which could be in the vicinity of 2 km for a Micro cell BS, a few hundred meters for a Pico cell, and tens of meters or less for a Femto cell BS. These values are the typical value defined by the Long Term Evolution (LTE) specification. It should be noted that the actual ranges for all the above-mentioned types of BSs could fluctuate over time. The Macro cell BS 201 would be able to communication with a small cell BS 202 through an inter-eNB interface such as the X2 interface if the small cell BS 202 is either a Micro cell BS or a Pico cell BS. If the small cell BS 202 is a Femto cell BS, the Macro cell BS 202 could communicate with the Femto cell BS through an interface such as the Asymmetric digital subscriber line (ADSL) interface.

The UE 203 with device mobility is assumed to connect to the Macro cell BS 201 initially. When the UE 203 is moving close to or within the range 205 of the small cell BS 202, the Macro cell BS 201 could execute a handover procedure in order to let the UE 203 to be served by the small cell BS 202 for traffic offloading. The challenge here is that the communication system of FIG. 2 overall would need to know the feasibility of the handover so that the Macro cell BS 201 could successful offload the UE 203 to the small cell BS 202 as soon as possible. This would mean that UE 203 would first need to know the existence of the small cell BS 202 by performing inter-frequency measurements and eventually reporting parameters related to the signal quality of the small cell BS 202 to the Macro cell BS 201.

Inter-frequency measurements would involve a trade off between power consumption and detection speed. To minimize the duration of the inter-frequency measurements for an offload target, it would be better to have a correct trigger timing in order to initiate the inter-frequency measurement for the offload target. Therefore, the present disclosure proposes using a small cell BS to transmit a discovery signal (DS) on the frequency of the Macro cell BS. First, the general principle of the present disclosure will be described. Instead of using signalings such as PSS, SSS, and System Information, the Macro cell BS would first negotiate with the small cell BS for a schedulable radio resource to transmit the DS. The DS could be a general reference signal, which could be different contents for identification of different small cells, on Macro cell operation frequency and would be schedulable. This would mean that the DS could be transmitted on reserved resource blocks of a general reference signal such as the Channel-State Information Reference signal (CSI-RS) or the Demodulation Reference Signal or (DM-RS) or the Cell Specific Reference Signal (CRS) or a pilot signal. In another exemplary embodiment, the DS could also be transmitted with same content on different schedulable resources for identification of different small cells. Based on negotiation with small cell BSs, the Macro cell BS could schedule the DS by configuring the period and the sub-frame offset or sub-frame number of the DS across the inter-eNB interface or ADSL. The same DS could be transmitted by a set of small cell BSs. For example, a clustered small cells could be deployed to cover a specific area such as a campus in which the same DS could be used to notify a UE upon entering the service area of the clustered small cells.

When the resource allocation of the DS has been negotiated between the Macro cell BS and the small cell BS and has been determined, the Macro cell BS would inform the resource allocation for the DS to the UE(s). The UE(s) could then stay on the Macro cell frequency to detect and measure for the DS without interruption of communication with the Macro cell BS, and thus a UE with just one RX/TX could be spared from wasting time tuning among different frequencies. After the Macro cell BS receives from the UE(s) a measurement report which indicates at least one qualified DS(s) meaning that the signal quality of the discovered DS(s) would be above a certain threshold, the inter-frequency measurement could then be triggered as the Macro cell BS may send a measurement command which would include information related to the small cell BS to the UE(s) to measure for the small cell BS in the small cell frequency. When the signal quality has been deemed adequate by the Macro cell BS, the Macro cell BS would perform a handover procedure to offload the UE(s) from the Macro cell BS to the small cell BS.

For the exemplary scenario of FIG. 2, the Macro cell BS 201 would first reserve a radio resource for the small cell BS 202 to transmit the DS on F1. The Macro cell BS 201 would then inform the schedule of the reserved radio resource for DS to both the small cell BS 202 and the UE 203. The Macro cell BS 201 would then configure the UE 203 to measure for the DS and could receive the measurement report of at least one detected DS(s) from the UE 203. The Macro cell BS 201 would then configure the UE 203 to perform the inter-frequency measurement for the small cell BS 202 in the small cell frequency of F2. When the measurement report of the small cell BS in frequency of F2 indicates satisfactory signal quality from the small cell BS 202, the Macro cell BS 201 could then trigger a handover procedure for the UE 203 to switch its radio connection to be served by the small cell BS 202.

From the perspective of small cell BS 202, the small cell BS 202 would first transmit the DS on the radio resources reserved on F1 frequency by the Macro cell BS 201. During the transmission period of DS, the small cell BS 202 may suspend the service for UEs attached to the small cell BS 202 assuming that there is not RF capability to support simultaneous transmission on both DS on the F1 frequency and data for the UEs attached to the small cell BS 202 on the F2 frequency.

Figure 3:
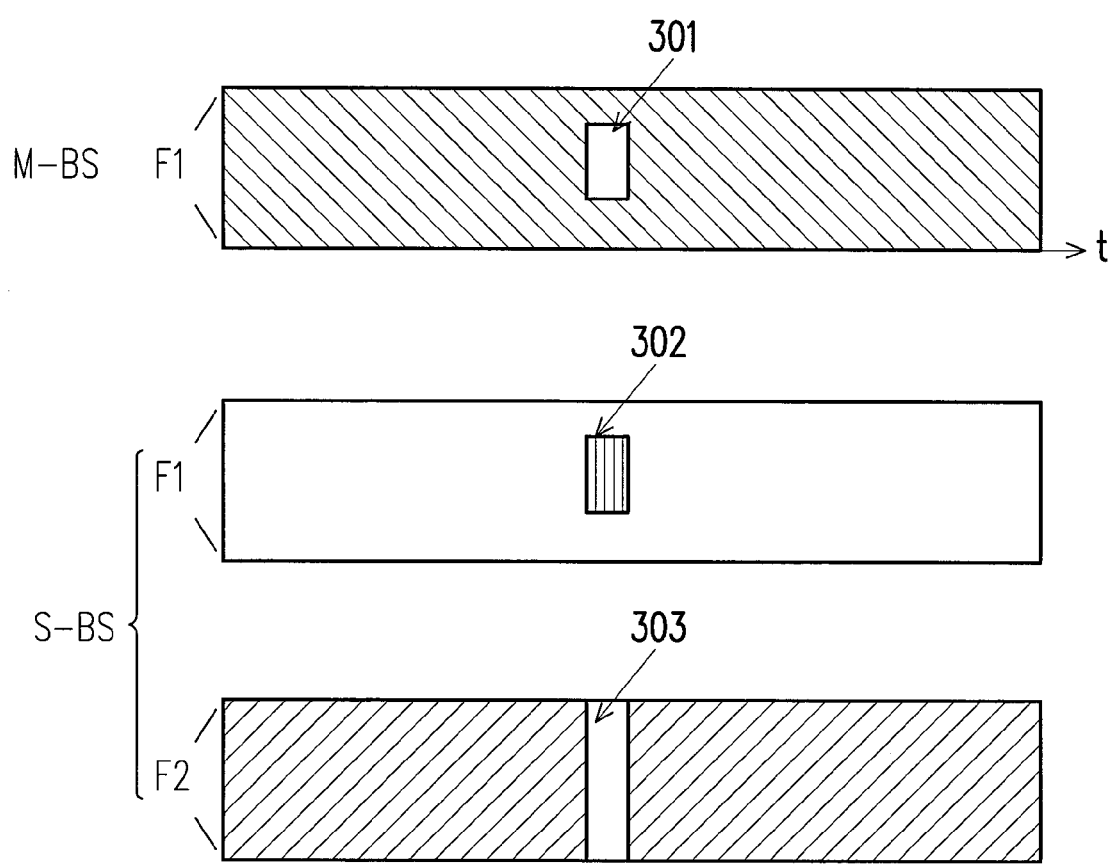
FIG. 3 illustrates a reserved resource for a discovery signal in accordance with one of the exemplary embodiments of the present disclosure.

FIG. 3 illustrates a reserved resource for a DS in accordance with one of the exemplary embodiments of the present disclosure. In the exemplary scenario of FIGS. 2 and 3, the Macro cell BS 201 is assumed to transmit on a carrier frequency F1, and the small cell BS 202 is assumed to be able transmit on the Macro cell frequency F1 and on small cell frequency F2. During the scheduled DS resource 301 on frequency F1, the Macro cell BS 201 may not transmit signals within the DS resource 301 in order to avoid interference with the DS 302 transmitted from the small cell BS 202. The small cell BS 202 would transmit the DS within the DS resource 302 on the frequency of the Macro cell frequency F1; however, during the DS transmission on frequency F1, the small cell BS 202 may or may not transmit data across the entire OFDM spectrum of the small cell frequency F2. If the small cell BS 202 does not possess a Carrier Aggregation (CA) capability, the small cell BS 202 would not be able to simultaneously transmit signals on both the Macro frequency F1 and the small cell frequency band F2. In that case, the small cell BS 202 would then generate a transmission gap on the small cell frequency during the scheduled DS resource 303 and switch to the Macro frequency F1 to transmit the DS during the DS resource 302.

Here the DS resources 301~303 could be configured on reserved resource blocks of a general reference signal such as the Channel-State Information Reference signal (CSI-RS) or the Demodulation Reference Signal or (DM-RS) in the frequency F1 of the Macro cell carrier frequency or other reference signal acts like the Cell Specific Reference Signal (CRS). The Macro cell BS could schedule the DS resources by configuring the period and the sub-frame offset of the DS resources and informing the small cell BS 202 and the UE 203 of the configuration.

Figure 4A:
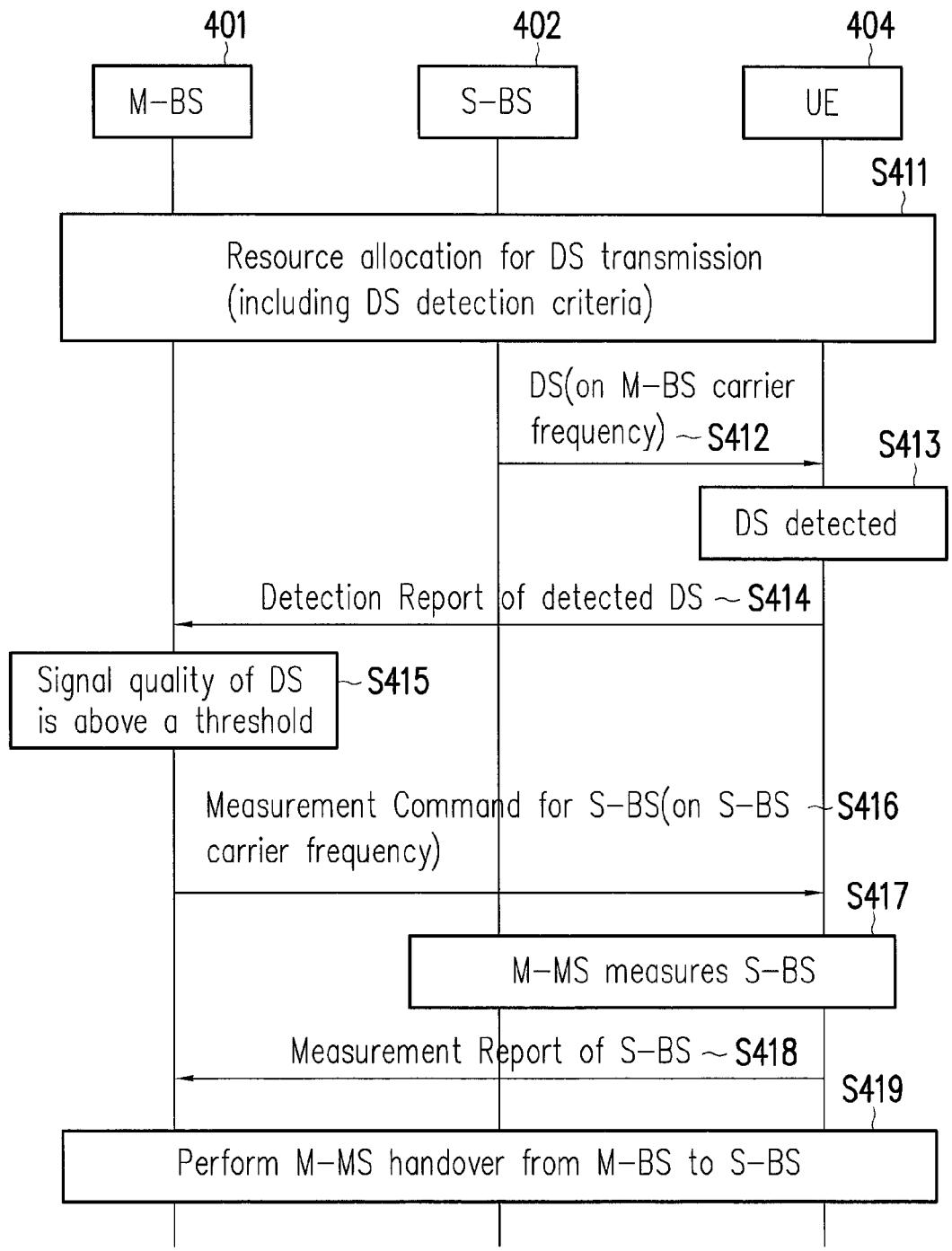
FIG. 4A is a signal flow chart illustrating small cell detection in accordance with one of the exemplary embodiments of the present disclosure.

FIG. 4A is a signal flow chart illustrating small cell detection in accordance with one of the exemplary embodiments of the present disclosure. FIG. 4A assumes a similar exemplary scenario as FIG. 3 and illustrates the interaction among a Macro cell BS 401, a small cell BS 402, and a UE 404 which initially connects to the Macro cell BS 401. In step S411, after the Macro cell BS 401 negotiated the DS resource allocation with the small cell BS 402 and/or the UE 404, the Macro cell BS 401 would allocate resources for DS transmission and inform the allocation of DS transmission resources to both the small cell BS 402 and the UE 404. In step S412, the small cell BS 402 would transmit the DS on the carrier frequency of the Macro cell BS 401. In step S413, the DS would be assumed to be detected by the UE 404, and then in step S414 the UE 404 would transmit a detection report of the detected DS to the Macro cell BS 401. In step S415, the Macro cell BS 401 would determine from the detection report of the detected DS whether the signal quality of the DS is above a certain predetermined threshold. Assuming that the signal quality of the DS is above a predetermined threshold, in step S416, the Macro cell BS 401 would transmit a measurement command to the UE 404 for measurement of the signal quality of the small cell BS 402 on the carrier frequency of the small cell BS 402. In step S417, the UE 404 would measure for the signal quality of the small cell BS 402. In step S418, the UE would transmit the measurement report of the signal quality of the small cell BS 402 to the Macro cell BS 401. In step S419, assuming that the signal quality of the small cell BS 402 has been determined to be adequate, the Macro cell BS 401 would perform a handover procedure for the UE 404 to be served by the small cell BS 402.

It should be noted that it another embodiment of FIG. 4A, in step S411, instead of the Macro cell BS 401 negotiating the DS resource allocation with the small cell BS 402 and/or the UE 404, the Macro cell BS 401 could directly determine the allocation of resources for DS transmission and inform the allocation of DS transmission resources to both the small cell BS 402 and the UE 404.

Figure 4B:
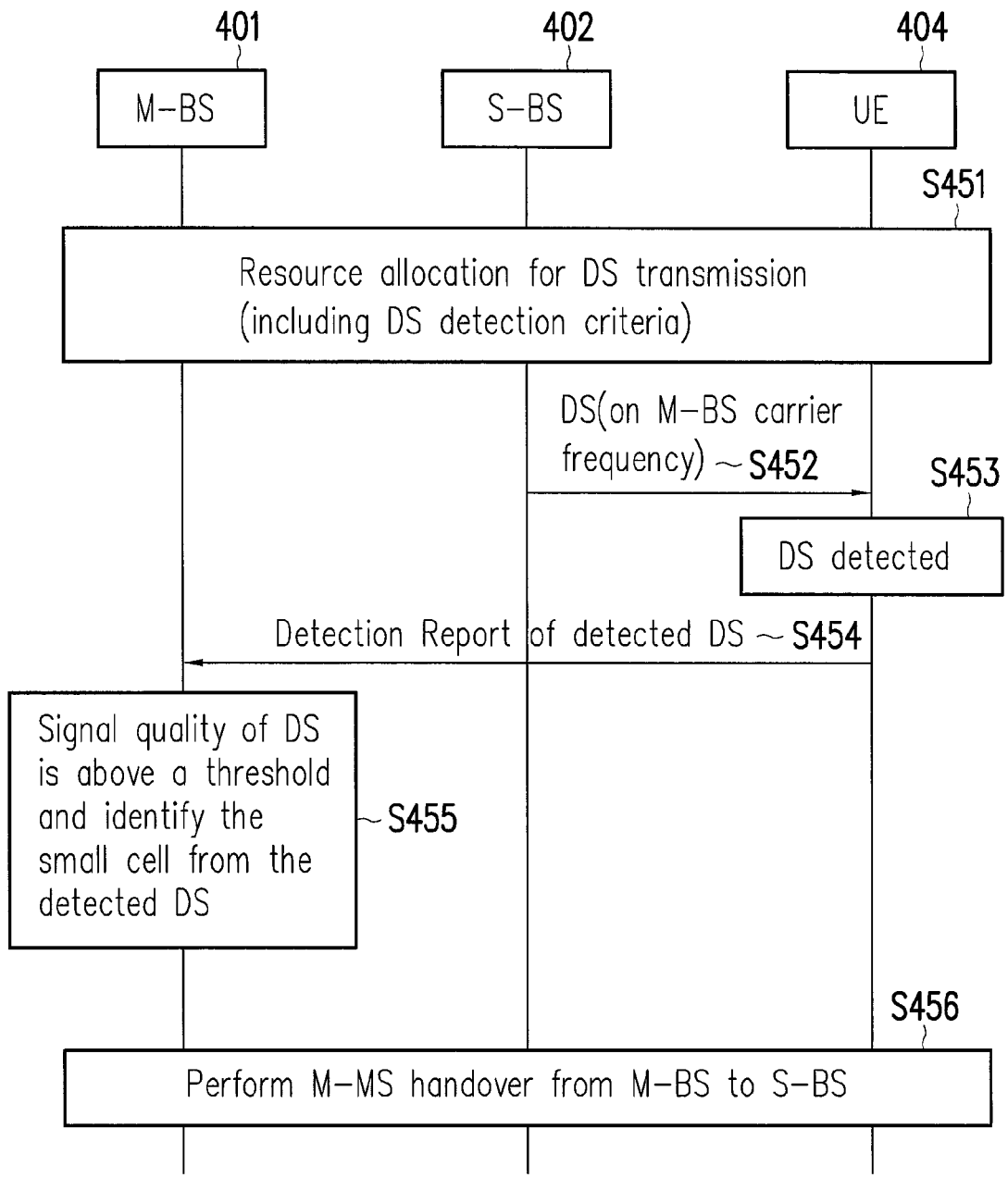
FIG. 4B is a signal flow chart illustrating small cell detection in accordance with one of the exemplary embodiments of the present disclosure.

FIG. 4B is a signal flow chart illustrating small cell detection in accordance with one of the exemplary embodiments of the present disclosure. This embodiment is similar to FIG. 4A but after step S415 has been executed, S419 would be executed in response to the result of the signal quality of DS. More specifically, steps S451~steps S454 and step S456 would mirror the steps S411~S414 and step S419 respectively and thus a detail description will not be provided. In step S455, when the M-BS 401 determines that the signal quality of DS is above a threshold, the M-BS 401 would identify the small cell BS 402 from the detected DS. In step S456, the Macro cell BS 401 would perform a handover procedure for the UE 404 to be served by the small cell BS 402.

Another exemplary scenario similar to FIG. 4A or FIG. 4B could be proposed with one difference being that there are more than one small cell base stations (e.g. S-BS1, S-BS2) which would transmit their own individual discovery signals on the same DS resource or different discovery signals on the same DS resource. In other words, the DS could be either a one-to-one mapping or a one-to-many mapping with small cell BSs. In the latter case when a group of small cell BSs transmit the same DS over the same DS resources, the Macro cell BS may provide for an UE which sends the detection report of the detected DS(s) to the Macro cell BS an inter-frequency measurement command which would include a cell list such as the cell IDs and operation frequencies of the small cell group corresponding to the detected DS(s). Generally, one-to-many mappings would reduce the number of discovery signals transmitted on Macro cell frequency but UE(s) attached to the Macro cell BS would have to perform inter-frequency measurements for more small cell BSs.

Figure 5:
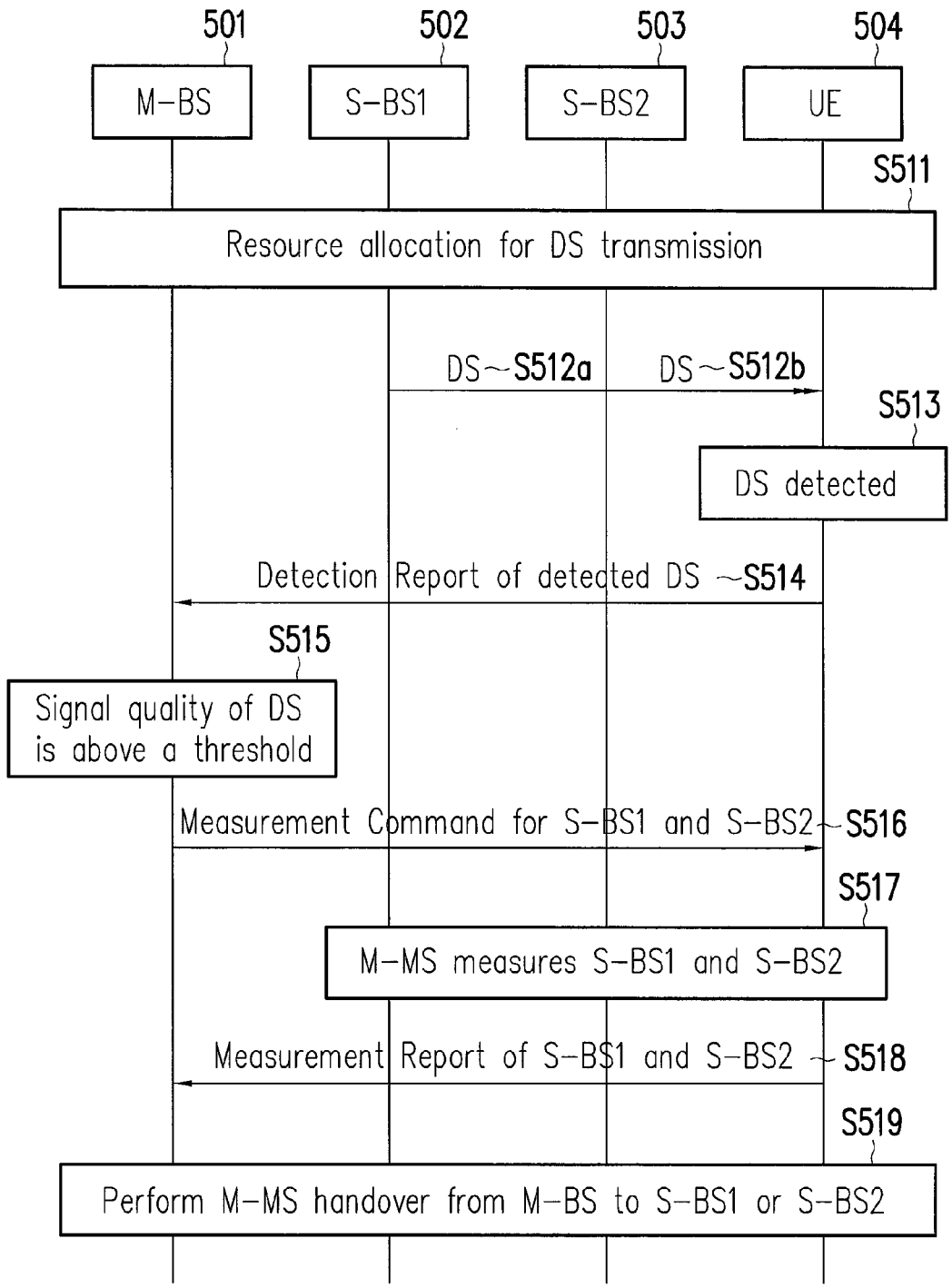
FIG. 5 is a signal flow chart illustrating small cell detection with multiple small base stations transmitting a discovery signal on the same radio resources in accordance with one of the exemplary embodiments of the present disclosure.

FIG. 5 is a signal flow chart illustrating small cell detection with multiple small cell BSs transmitting a discovery signal on the same radio resources in accordance with one of the exemplary embodiments of the present disclosure. For the exemplary purpose, FIG. 5 would have two small cell BSs, S-BS1 502 and S-BS2 503 and one-to-many mapping of the DS to small cell BSs would be assumed. In step S511, after the Macro cell BS 501 negotiated the DS resource allocation with the small cell BSs 502 503 (or S-BS1 502 and S-BS2 503) and/or the UE 504, the Macro cell BS 501 would allocate resources for DS transmission and inform the allocation of resources to both the small cell BSs 502 503 and the UE 504. The Macro cell BS 501 may allocate the same DS resources for both the small cell BSs 502 503.

In step S512a, the small cell BS 502 would transmit the DS on the allocated DS resource over the carrier frequency of the Macro cell BS 501. In step S512b, the small cell BS 503 would transmit the DS on the allocated DS resource over the carrier frequency of the Macro cell BS 501. In step S513, the DS from at least one of small cell BSs 502 503 would be assumed to be detected by the UE 504, and then in step S514 the UE 504 would transmit a detection report of the detected DS to the Macro cell BS 501. In step S515, the Macro cell BS 501 would determine from the detection report of the detected DS whether the signal quality of the detected DS is above a certain predetermined threshold. Assuming that the signal quality of the detected DS from small cell BS 502 and/or 503 is above a predetermined threshold, in step S516, the Macro cell BS 501 would transmit a measurement command to the UE 504 for measurement of the signal quality of the small cell BSs 502 503 on the carrier frequency of the small cell BSs 502 503. In step S517, the UE 504 would measure for the signal qualities of the small cell BSs 502 503, respectively. In step S518, the UE would transmit the measurement report of the signal qualities of the small cell BSs 502 503 to the Macro cell BS 501. In step S519, assuming that at least one signal qualities of the small cell BSs 502 503 have been deemed adequate, the Macro cell BS 501 would perform a handover procedure for the UE 504 to be served by one of the small cell BSs 502 503.

Figure 6:
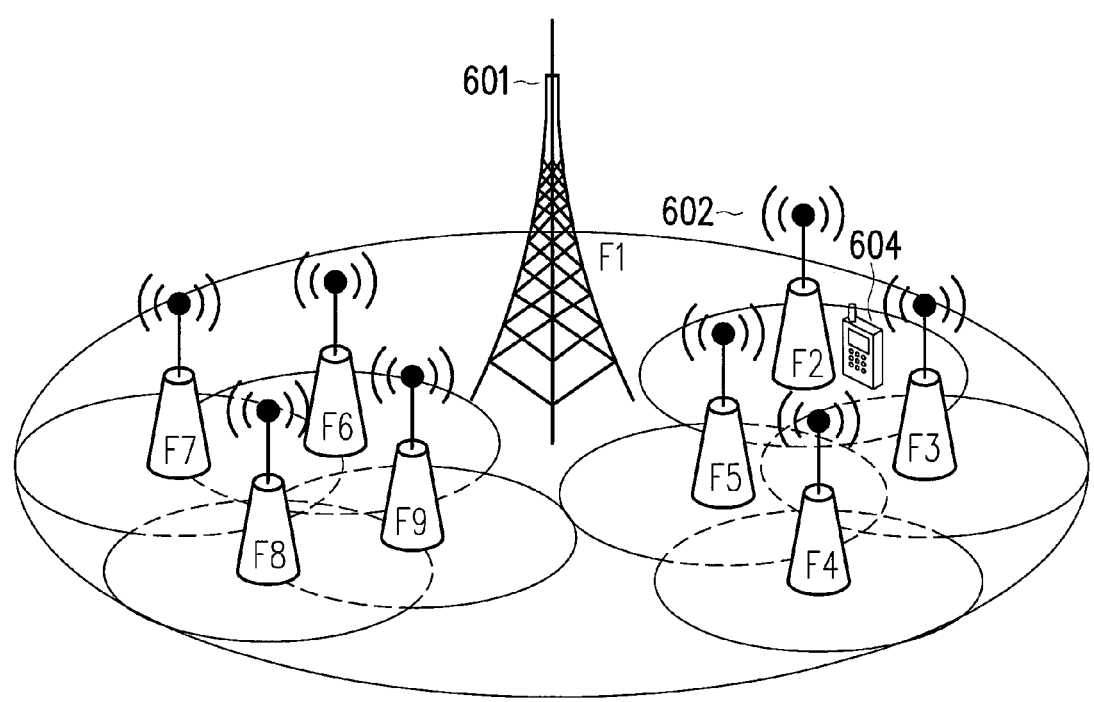
FIG. 6 illustrates another exemplary embodiment of a clustered small cell deployment coverage involving a Macro cell BS in conjunction with a plurality of small cell BSs operated under different frequencies.

FIG. 6 illustrates another exemplary embodiment of a non-uniform cell coverage involving a Macro cell BS in conjunction with a plurality of small cell BSs deployed on more than one frequencies. For the exemplary scenario of FIG. 6, it would assume a plurality of small cell BS with different frequencies (F1~F8) as potential offload targets for the Macro cell BS 601. On carrier frequencies of the small cell BSs, since the number of physical cell identity (PCIs) would currently be limited to a fixed number such as 502, a PCI may have to be re-used for more than one small cells under a Macro cell coverage. Therefore, on the carrier of Macro cell BS, cell specific reference signal (CRS) such as the Channel-State Information Reference signal (CSI-RS) could be transmitted to UE(s) with connection to the Macro cell BS in order to identify whether the UE(s) is close to a small cell BS. When a PCI and a CRS are known by a UE(s), the UE(s) may include such information in a measurement report transmitted to the Macro cell Base station which would be able to identify neighboring small cell BS for the UE(s). Based on the ranking of CRS measurement, the Macro cell BS M-BS may identify the most suitable small cell BS targets for the UE(s). The Macro cell BS may send corresponding PCI information of the neighboring small cell BS for the UE(s) to perform corresponding (inter-frequency) measurements.

In the exemplary scenario of FIG. 6, each of the small cell BS could transmit on the frequency of the Macro cell BS 601a different DS based on the CRS. By using CRS as the DS of a small cell BS, it would be easy to perform a one-to-one mapping between a DS and a small cell BS. After the DSs are detected by the UE 604, the UE 604 may transmit a detection report to the Macro cell BS 601 to report the detected discovery signals. When assuming that the Macro cell BS 601 would identify the small cell BS 602 as one of the most suitable targets, the Macro cell BS 601 may then transmit a measurement command including PCI information of neighbor small cells including the small cell BS 602 in order for the UE 604 to perform the subsequent inter-frequency measurement. Assuming that the small cell BS 602 has been identified by the Macro cell BS 601 as the most suitable handover target, the Macro cell BS 601 would initiate a subsequent handover procedure to offload the UE 604 to the small base station 602.

Figure 7:
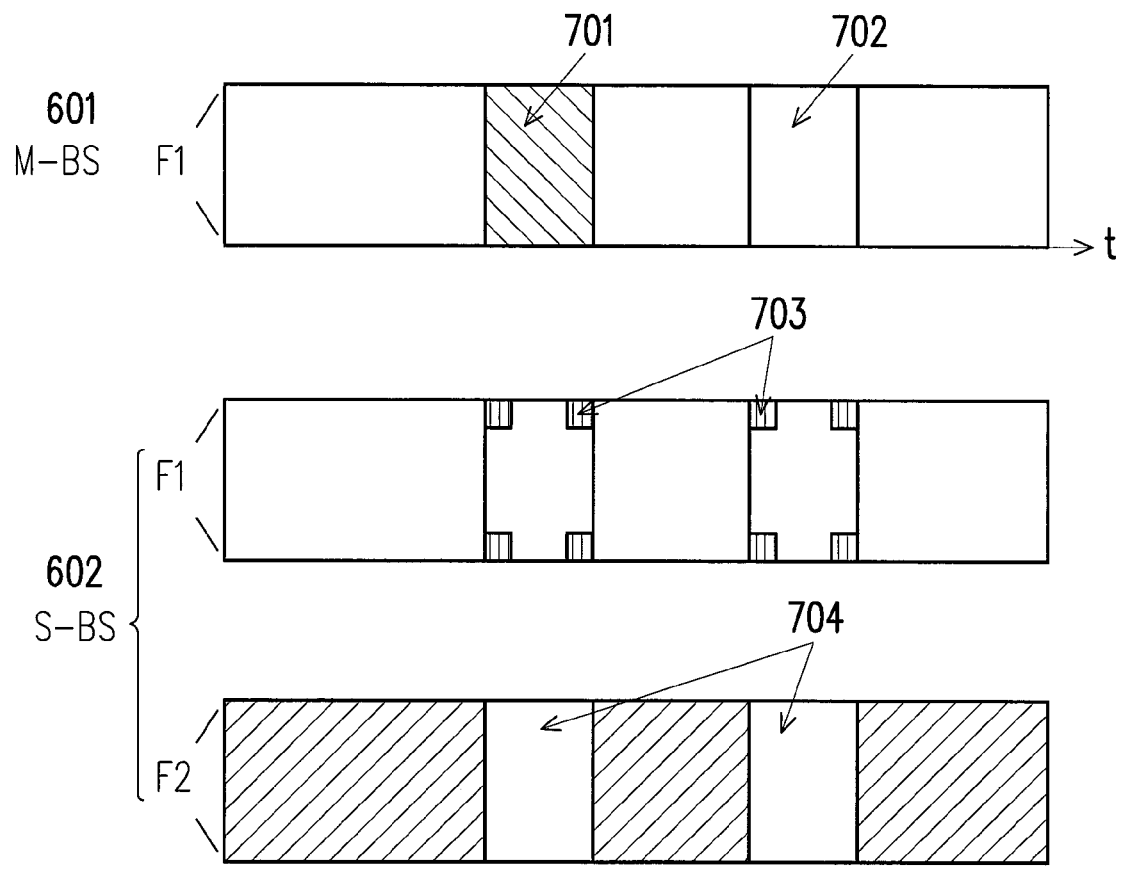
FIG. 7 illustrates transmission of a discovery signal using a cell specific reference signal in accordance with one of the exemplary embodiments of the present disclosure.

FIG. 7 illustrates using a CRS as a DS in accordance with one of the exemplary embodiments of the present disclosure. Referring to FIG. 6 and FIG. 7 together, it is assumed that the Macro cell BS 601 operates over frequency F1, the small cell BS 602 operates over frequency F2, and the Macro cell BS 601 allocates resources for DSs such as over resources 701 and 702. In one exemplary embodiment, the Macro cell BS 601 may transmit normal data on resource blocks (RBs) of 701 which would be used for the small cell BS 602 to transmit CRS assuming that the interferences would be tolerable. Otherwise, in another exemplary embodiment, the Macro cell BS 601 would not transmit normal data on RBs of 702 which would be used for the small cell BS 602 to transmit CRS if the interferences would not be tolerable. The small cell BS 602 would transmit CRS 703 in the resources 701 and 702 on the frequency F1 of the frequency of the Macro cell BS. During time when the resources 701 and 702 are reserved to transmit DS, the small cell BS 602 may generate a gap 704 in the frequency F2 if the small cell BS 602 lacks the RF capability to simultaneously aggregate multiple carriers. Otherwise, the small cell BS may also transmits data normally over F2 without generating the gap 704.

Figure 8:
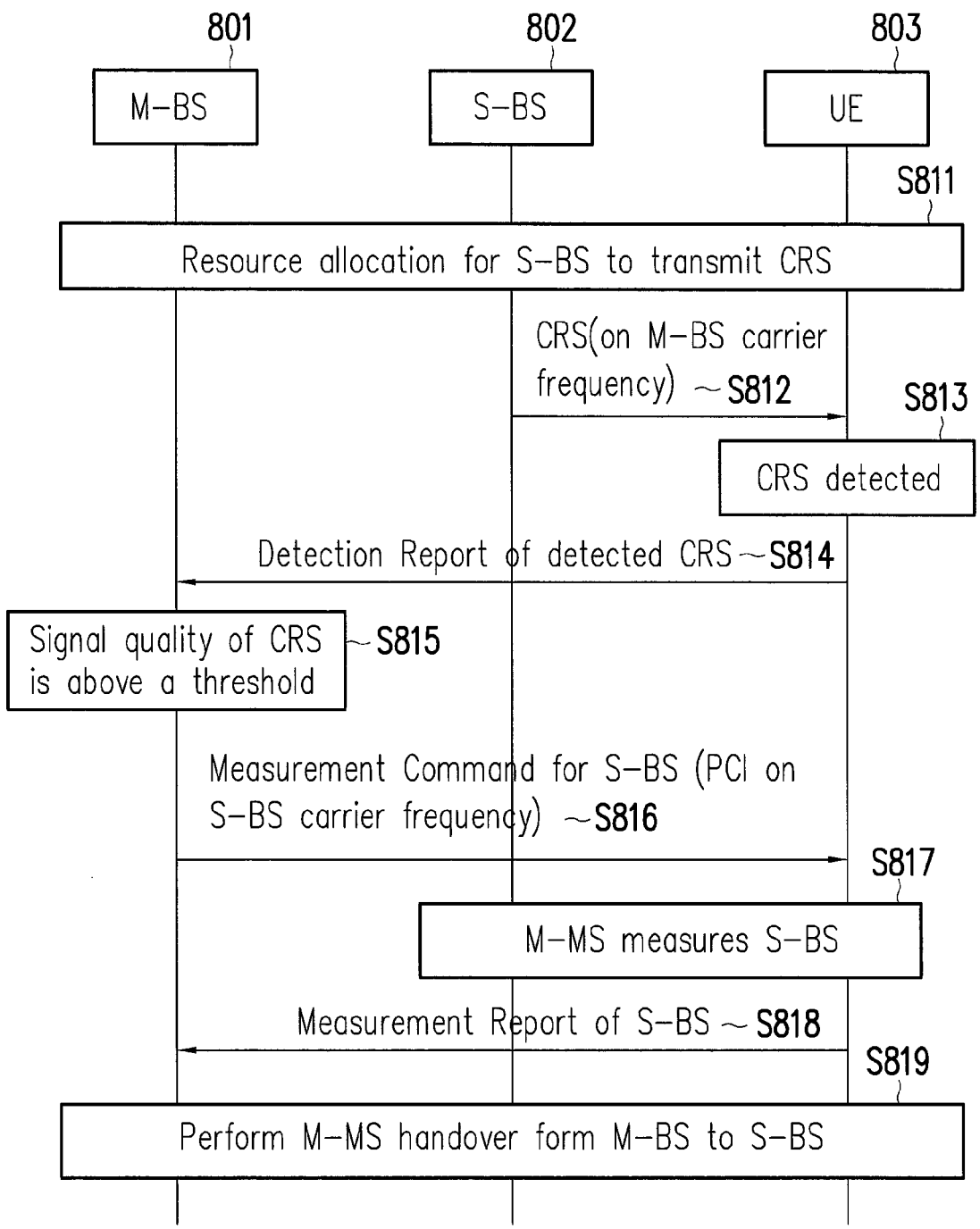
FIG. 8 is a signal flow chart illustrating a small cell detection procedure by using a cell specific reference signal as a discovery signal in accordance with one of the exemplary embodiments of the present disclosure.

FIG. 8 is a signal flow chart illustrating a small cell detection procedure by using a cell specific reference signal as a discovery signal in accordance with one of the exemplary embodiments of the present disclosure. It should be noted that even though the flow chart involves a Macro cell BS 801, a small cell BS 802, and a UE 803, it would be apparent for one skilled in the art to extended the flow chart for multiple small cell BSs in a similar fashion as in FIG. 5. In step S811, the Macro cell BS 801 allocates resource(s) for the small cell BS 802 for the purpose of transmitting CRS(s) as a discovery signal. In step S812, the small cell BS 802 may transmit a CRS on the carrier frequencies of the Macro cell BS 801. In step S813, the UE 803 may detect the CRS from the small cell BS 802. In step S814, assuming that the CRS is successfully detected by the UE 803, the UE 803 would transmit a detection report of the detected CRS to inform the Macro cell BS 801 the detected CRS. In step S815, the Macro cell BS 801 determines whether the signal quality of the CRS according to the measurement report is above a predetermined threshold. In step S816, assuming that the signal quality of the CRS is above the threshold, the Macro cell BS 801 would transmit a measurement command to the UE 803 to measure for the small cell BS 802 on the operating frequency of the small cell BS 802. The measurement command may include information such as the PCI and the operating frequency of the small cell BS 802. In step S817, the UE 803 measures for the signal quality of the small cell BS 802. In step S818, the UE transmits the measurement report of the signal quality of the small cell BS 802 to the Macro cell BS 801. In step S819, assuming that the signal quality of the small cell BS has been determined by the Macro cell BS 801 to be satisfactory, the Macro cell BS 801 would then perform a handover procedure to offload the UE 803 to be served by the small cell BS 802.

Generally, in order to adopt a one-to-one mapping between a DS and a small cell BS, the number of DSs may increase as the number of small cell BSs increases. If cross interference is tolerable, different DSs could be allowed to be transmitted on the same radio resources. For example, a certain number of code division multiple access (CDMA) codes could be used to represent the different DSs transmitted at the same time, and the different DSs could be detected simultaneously. Another example would be to allocate multiple non-overlapping CRS patterns on the same resource blocks allocated for the DSs. On the other hand, the same DS could also be re-used for different small cell BSs by allocating of different transmission radio resources such as different sub-frame offsets, different sub-channels or different RB numbers.

FIG. 9 illustrates a look up table from which a Macro cell BS may utilize to negotiate with small cell BSs for resources to transmit a DS. Based on the aforementioned scheme of allocating DS patterns or resource locations, the same DS could also be re-used for different small cell BSs. In particular, the first row of FIG. 9 shows an index of 6 different small cell BSs. In the second row of FIG. 9, the DS pattern A could be used for small cell BS 1~3, and the DS pattern B could be used for small cell BS 4~6. The DS patterns A and B could be represented by different CDMA codes. For small cell BS 1~3, their DSs could be further distinguished based on the sub-frame offset number, sub-channel number, or different RB number as illustrated on the third row of FIG. 9. The same principle would be applied to small cells BS 4~6 as well.

In all the embodiments, a DS could be transmitted either periodically or non-periodically (event-triggered) on Macro cell operation frequency. Periodically transmission may require more resources on Macro cell frequency to transmit DS in order to allow UE(s) attached to a Macro cell BS more opportunities to perform traffic offloading through small cell BSs. Event-triggered transmission may be initiated by a Macro cell BS to ask a portion of UEs currently connected to the Macro cell BS to perform small cell detection for offloading. For example, some small cell BSs may operate in a network energy saving mode if there is no or few connections with the small cell BSs. When a Macro cell BS needs offloading by these small cells, one or more small cell BS may start to transmit DSs. On the other hand, if a small cell BS is also fully loaded, the small cell BS may temporarily suspend the DS transmission.

Figure 10:
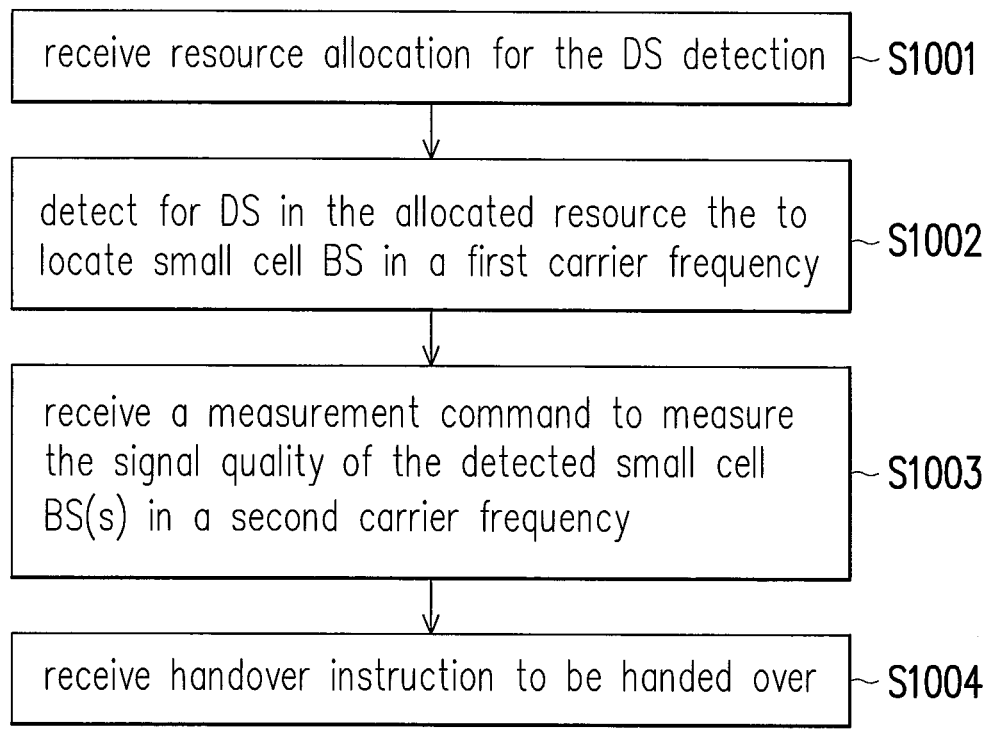
FIG. 10 illustrates a small cell detection method from the perspective of a user equipment in accordance with one of the exemplary embodiments of the present disclosure.

FIG. 10 illustrates a small cell detection method from the perspective of an UE in accordance with one of the exemplary embodiments of the present disclosure. In step S1001, the UE would receive resource allocation for the DS transmission. The resource allocation could be event triggered or periodic. In step S1002, the UE may detect in the allocated resource the DS which signifies the presence of at least one small cell BSs over the operating frequency of Macro cell BS. The DS could be allocated on reserved resources of a general reference signal such as a CSI-RS, a DM-RS or a CRS. In step S1003, the UE would receive a measurement command to measure the signal quality of the detected small cell BS(s) over the operating frequency of the detected small cell BS(s). The measurement command may include PCI and operating frequencies of detected small cell BS(s). In step S1004, after measurement is performed with results reported to the current connected Macro cell BS, the UE may receive a handover instruction and/or a handover command as the UE is handed over to the small cell BS. Before step S1001, the UE may receive information of schedulable resource in the first frequency from an external source such as a base station under which the UE receives a wireless service. The information of the schedulable resource may include at least one of a pattern of the discovery signal, a sub-frame number, a sub-channel number, and a resource block number.

Figure 11:
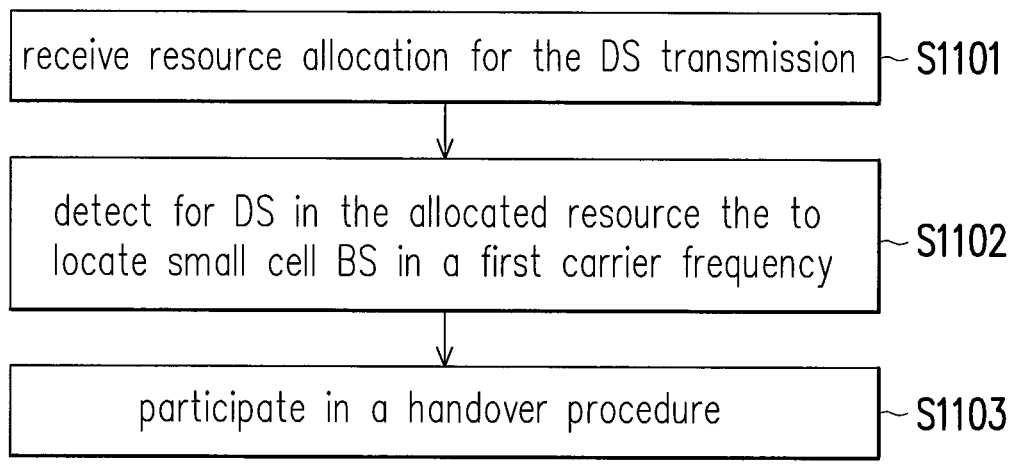
FIG. 11 illustrates a small cell detection method from the perspective of a small cell base station in accordance with one of the exemplary embodiments of the present disclosure.

FIG. 11 illustrates a small cell detection method from the perspective of a small cell BS in accordance with one of the exemplary embodiments of the present disclosure. In step S1101, the small cell BS would receive resource allocation for the DS transmission. The resource allocation could be event triggered or periodic. In step S1102 the small cell BS may transmit in the allocated resource the DS which signifies the presence of at least one small cell BS over the operating frequency of Macro cell BS. The DS could be allocated on reserved resources of a reference signal or could be a CRS. In step S1103, the small cell BS would be involved in the handover procedure to serve a UE offloaded from a Macro cell BS. The small cell base station could be any one of a micro cell base station, a pico cell base station, and a femto cell base station.

In view of the aforementioned descriptions, the present disclosure is able to optimize data offloading potential in locations with non-uniform coverage by performing detections of a DS transmitted by a small cell BS in the operating frequency of the Macro cell BS. The DS would be dynamically or semi-persistently allocatable allocated in reserved resource blocks of a reference signal or be transmitted as a cell specific reference signal. In this way, mutual interference between the Macro cell BS and the small cell BS would be mitigated. Also by detecting the DS in pre-allocated resources which would be informed to both a UE and a small cell BS, unnecessary waste of power consumption used for detection could be curtailed and detection delay could be reduced.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

A base station in this disclosure may also include base stations such as an advanced base station (ABS), a base transceiver system (BTS), an access point, a home base station, a relay station, a repeater, an intermediate node, an intermediary, and/or satellite-based communication base stations.

From the hardware perspective, a base station may include at least but not limited to a transmitter circuit, a receiver circuit, an analog-to-digital (A/D) converter, a digital-to-analog (D/A) converter, a processing circuit, one or more antenna units, and optionally a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing circuit is configured to process digital signal and to perform functions, processes or procedures, or method steps of the proposed method in exemplary embodiments of the present disclosure. Also, the processing circuit may optionally be coupled to a memory circuit to store programming codes, device configurations, a codebook, buffered or permanent data, and etc. The functions of the processing circuit may be implemented using programmable units such as a micro-processor, a micro-controller, a DSP chips, FPGA, etc. The functions of the processing circuit may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, a UE may includes at least but not limited to a transmitter circuit, a receiver circuit, an analog-to-digital (A/D) converter, a digital-to-analog (D/A) converter, a processing circuit, one ore more antenna units, and optionally a memory circuit. The memory circuit may store programming codes, device configurations, buffered or permanent data, codebooks, and etc. . . . . The processing circuit may also be implemented with either hardware or software and would be considered to implement the functions, processes or procedures, and method steps of embodiments of the present disclosure. The function of each element of a UE is similar to a control node and therefore detailed descriptions for each element will not be repeated.

No element, act, or instruction used in the detailed description of the disclosure should be construed as critical or essential to the present disclosure unless explicitly described as such. Also, as used herein, each of the indefinite articles "a" and "an" is not intended to exclude more than one item but may include more than one item. If only one item is intended, the terms "a single" or similar languages could be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A small cell base station detection method adapted for a user equipment comprising:

receiving a schedulable resource for a discovery signal over a first frequency, wherein resource allocation of the discovery signal is negotiated between the small cell base station and a macro cell base station in advance, wherein the discovery signal is in the schedulable resource which is reserved resource blocks of a reference signal;

detecting the discovery signal over the schedulable resource in the first frequency which is the operating frequency of the macro cell base station;

transmitting a detection report in response to detecting the discovery signal;

receiving a measurement command comprising a second frequency which is the operating frequency of the small cell base station;

measuring at least a signal quality of the second frequency to generate a measurement report; and transmitting the measurement report in response to generating the measurement report of the at least one second frequency.

2. The method of claim 1 further comprising:

identifying a small cell from the discovery signal; and receiving a handover command to be handed over to the small cell.

3. The method of claim 1, wherein before the step of detecting the discovery signal over the scheduled resource in the first frequency, claim 1 further comprises:

receiving information of the schedulable resource in the first frequency from an external source under which the user equipment receives a wireless service.

4. The method of claim 3, wherein the information of the schedulable resource includes at least one of a pattern of the discovery signal, a sub-frame number, a sub-channel number, and a resource block number.

5. The method of claim 1, wherein the reference signal is one of a pilot signal, a channel state information reference signal (CSI-RS), and a demodulation reference signal (DM-RS).

6. The method of claim 1, wherein the discovery signal is a cell specific reference signal (CRS).

7. The method of claim 1, wherein the measurement command further includes a physical cell identity (PCI).

8. The method of claim 1, wherein the measurement command further includes a small cell operation frequency.

9. The method of claim 1 further comprising:

measuring at least one of a signal quality of the at least one second frequency which is included in the measurement report.

10. A handover method adapted for a small cell base station comprising:

receiving a schedulable resource for a discovery signal over a first frequency, wherein resource allocation of the discovery signal is negotiated between the small cell base station and a macro cell base station in advance, wherein the discovery signal is in the schedulable resource which is reserved resource blocks of a reference signal;

transmitting the discovery signal over the first frequency which is the operating frequency of the macro cell base station; and transmitting data over a second frequency which is the operating frequency of the small cell base station.

11. The method of claim 10 further comprising:

participating in a handover procedure after transmitting the discovery signal.

12. The method of claim 10 wherein when transmitting the discovery signal over the first frequency is being performed, transmitting data over the second frequency does not simultaneously occur.

13. The method of claim 12, wherein schedulable resource is configured according to at least one of a pattern of the discovery signal, a sub-frame number, a sub-channel number, and a resource block number.

14. The method of claim 10, wherein the reference signal is one of a pilot signal, a channel state information reference signal (CSI-RS), and a demodulation reference signal (DM-RS).

15. The method of claim 10, wherein the discovery signal is a cell specific reference signal (CRS).

16. The method of claim 15, wherein the small cell base station is identified by a physical cell identity (PCI) or the CRS.

17. The method of claim 10, wherein the schedulable resource is not periodic and is configured by an external source under which the user equipment receives a wireless service.

18. The method of claim 10, wherein the schedulable resource is semi-persistently scheduled.

19. The method of claim 10, wherein the small cell base station is one of a micro cell base station, a pico cell base station, and a femto cell base station.

20. A user equipment comprising a transmitter for transmitting wireless data, a receiver for receiving wireless data, and a processing circuit coupled to the transmitter and the receiver and is configured for receiving a schedulable resource for a discovery signal over a first frequency, wherein the discovery signal is in the schedulable resource which is reserved resource blocks of a reference signal, detecting the discovery signal over the schedulable resource in the first frequency which is the operating frequency of a first base station, transmitting through the transmitter a detection report in response to detecting the discovery signal, receiving through the receiver a measurement command comprising a second frequency which is the operating frequency of a second base station, measuring at least a signal quality of the second frequency to generate a measurement report, and transmitting through the transmitter the measurement report in response to generating the measurement report.

21. The device of claim 20, wherein the reference signal is one of a pilot signal, a channel state information reference signal (CSI-RS), and a demodulation reference signal (DM-RS).

22. The device of claim 20, wherein the discovery signal is a cell specific reference signal (CRS).

23. A small cell base station comprising a transmitter for transmitting wireless data, a receiver for receiving wireless data, and a processing circuit coupled to the transmitter and the receiver and is configured for receiving a schedulable resource for a discovery signal over a first frequency, wherein resource allocation of the discovery signal is negotiated between the small cell base station and a macro cell base station in advance, wherein the discovery signal is in the schedulable resource which is reserved resource blocks of a reference signal, transmitting the discovery signal over the first frequency which is the operating frequency of the macro cell base station, transmitting data over a second frequency which is the operating frequency of the small cell base station.

24. The device of claim 23, wherein the reference signal is one of a pilot signal, a channel state information reference signal (CSI-RS), and a demodulation reference signal (DM-RS).

25. The device of claim 23, wherein the discovery signal is a cell specific reference signal (CRS).

* * * * *